United States Patent
Gielens et al.

(10) Patent No.: US 12,484,598 B2
(45) Date of Patent: Dec. 2, 2025

(54) PROCESS FOR THE PREPARATION OF A FIBROUS PRODUCT

(71) Applicant: FrieslandCampina Nederland B.V., Amersfoort (NL)

(72) Inventors: Franciscus Christophorus Gielens, Wageningen (NL); Marjolein Maria Véronique Isabelle Broos, Wageningen (NL)

(73) Assignee: FrieslandCampina Nederland B.V., Amersfoort (NL)

( * ) Notice: Subject to any disclaimer, the term of this patent is extended or adjusted under 35 U.S.C. 154(b) by 398 days.

(21) Appl. No.: 18/014,949

(22) PCT Filed: Jul. 9, 2021

(86) PCT No.: PCT/EP2021/069115
§ 371 (c)(1),
(2) Date: Jan. 6, 2023

(87) PCT Pub. No.: WO2022/033781
PCT Pub. Date: Feb. 17, 2022

(65) Prior Publication Data
US 2023/0255235 A1    Aug. 17, 2023

(30) Foreign Application Priority Data
Aug. 12, 2020 (EP) .................................. 20190716

(51) Int. Cl.
*A23J 3/22* (2006.01)
*A23C 19/09* (2006.01)
*A23J 3/08* (2006.01)
*A23J 3/28* (2006.01)
*A23L 29/00* (2016.01)
*A23L 29/256* (2016.01)

(52) U.S. Cl.
CPC ............... *A23J 3/285* (2013.01); *A23C 19/09* (2013.01); *A23J 3/08* (2013.01); *A23J 3/227* (2013.01); *A23L 29/015* (2016.08); *A23L 29/256* (2016.08)

(58) Field of Classification Search
CPC .... A23J 3/285; A23J 3/08; A23J 3/227; A23L 29/256; A23L 29/015; A23C 19/09
USPC .......................................................... 426/582
See application file for complete search history.

(56) References Cited

U.S. PATENT DOCUMENTS

2023/0248023 A1*   8/2023   Gielens .................... A23J 3/08
                                                        426/574

FOREIGN PATENT DOCUMENTS

| EP | 1759593 | 3/2007 | |
|---|---|---|---|
| WO | 03061400 | 7/2003 | |
| WO | 2005004624 | 1/2005 | |
| WO | WO-2005004624 A1 * | 1/2005 | ............. A23C 19/09 |

OTHER PUBLICATIONS

International Search Report and Written Opinion, date of mailing Oct. 27, 2021, International Application No. PCT/EP2021/069115 (16 pgs.).

* cited by examiner

*Primary Examiner* — Brent T O'Hern
(74) *Attorney, Agent, or Firm* — Fitch, Even, Tabin & Flannery LLP

(57) ABSTRACT

Process for the preparation of a fibrous product comprising protein and having a moisture content of at least 65% by weight by first preparing a homogenous mixture of protein material comprising cheese, a moisture binder material, a calcium-complex forming agent, a hydrocolloid which precipitates with metal cations and water at a temperature from 70 to 90° C. under high shear with the pH of the homogenous mixture being from 6.4 to 7.5. The homogenous mixture has a water content of at least 75% by weight, whilst total protein content is from 5 to 20% by weight. A solution of a metal cation with a valency of at least 2 is subsequently added in order to form the fibrous product. This fibrous product is then isolated and cooled. The fibrous product thus obtained is particularly suitable for use in preparing meat substitute products.

18 Claims, No Drawings

PROCESS FOR THE PREPARATION OF A FIBROUS PRODUCT

CROSS REFERENCE TO RELATED APPLICATIONS

This application is a U.S. national phase application of International Application No. PCT/EP2021/069115, filed Jul. 9, 2021, which claims benefit from European Application No. 20190716.9, filed Aug. 12, 2020, which are each hereby incorporated herein by reference in their entirety.

FIELD OF THE INVENTION

The invention relates to a process for the preparation of a fibrous product having a moisture content of at least 65% by weight based on total weight of fibrous product and comprising protein, at least part of which is a milk protein material, which fibrous product is particularly suitable for preparing meat substitute products.

BACKGROUND TO THE INVENTION

Meat substitute products become more and more accepted as part of the diet of humans. With the increased acceptance of meat substitute products the demand for such products increases accordingly and hence the need for good quality starting products and efficient production methods which enable the manufacture of high quality meat substitute products at commercial scale.

WO 03/061400 A1 discloses a method for the preparation of a fibrous product which is suitable as meat substitute product and which comprises protein. In this method a protein material comprising milk protein material, a hydrocolloid which precipitates with metal cations and water are added together and formed into a homogenous mixture in the presence of a calcium complex forming agent. This mixture is subsequently mixed with a solution of a metal cation having a valency of at least 2 to form a fibrous product and the fibrous product is then isolated. This fibrous product is finished, suitably by washing, pressing and a preservation treatment into the final meat substitute product. Throughout the method according to WO 03/061400 A1 the temperature is kept at 20 to 90° C., most suitably around 50° C., pH between 4 and 7, suitably between 5.0 and 7.0. Examples of suitable milk protein materials disclosed in WO 03/061400 A1 are cheese curd, cheese, sodium caseinate, whey protein concentrate and powdered milk. In the working examples a fibrous material based on a high fat (50+% by weight on dry matter) cheese is prepared having a cheesy taste, a short fiber structure and a low moisture content of below 60% by weight (56.7% according to Table 1 in WO 03/061400 A1). The homogenous mixture prepared from the cheese, water and melting salt from which the fibrous product is eventually prepared has a water content below 70% by weight.

WO 2005/004624 A1 discloses a process for the preparation of a protein-based, fibrous food product similar to the process disclosed in the aforesaid WO 03/061400 A1 except that the homogenous mixture formed is first given a selected three-dimensional shape before it is contacted with a solution of a metal cation having a valency of at least 2 to form a fibrous product. The milk protein material may be selected from cheese curd (for cheese with fat content from 0 to 60% by weight on dry matter), cheese, milk powder, whey protein and a caseinate (alkali metal, alkaline earth metal or ammonium caseinate). Temperature is kept at 20 to 90° C., most suitably around 50° C., pH is between 4 and 8, suitably between 5.0 and 7.5. In an example described in WO 2005/004624 A1 (Examples A. and B. on pages 13/14) the preparation of a fibrous product from Gouda cheese, water and sodium polyphospate and adding dry alginate is compared with the preparation of a fibrous product from the same ingredients but using an aqueous alginate solution. The amount of alginate added is higher in the example with the dry alginate. Process conditions include heating the initial mixture of cheese, water and sodium polyphospate to 70° C., thereby obtaining an emulsion, and then adjusting the pH to 7 using a NaOH solution. Subsequently the dry alginate or alginate solution is added and mixed with the emulsion to form a homogenous mixture. This homogenous mixture is then processed to a fiber-comprising food product.

The present invention aims to provide a process for the preparation of a fibrous product wherein more water can be processed into the fibrous end product resulting in a fibrous product having a relatively high moisture content, resulting in a more juicy mouthfeel, whilst also having excellent taste properties (including no undesired cheese taste) as well as a good texture, notably by exhibiting a structure with long fibers, thus making the fibrous product very suitable as a basis for a meat substitute product.

SUMMARY OF THE INVENTION

It was found that the objects described above can be realized by a process wherein first of all the starting protein material used comprises cheese as the starting milk protein material. Further, the starting protein material is effectively mixed with a relatively high amount of water, a suitable water-binding material, a calcium-complex forming agent and a hydrocolloid to form a homogenous mixture, thereby carefully controlling the pH of this homogenous mixture formed. Subsequently, a solution of a metal cation with a valency of at least 2 is added and mixed into the homogenous mixture to form the fibrous product which can then be isolated and cooled.

An important advantage of the present process is that by processing more water into the end product, processability is improved and the process becomes more economically attractive, notably because water is a less costly ingredient than proteins or fat. A higher water content also enables forming a fibrous end product having a more juicy mouthfeel. A further advantage is that by using cheese as the main protein source instead of cheese curd, production of the fibrous product can be completely decoupled from a cheese factory where cheese curd would typically be produced. Another advantage of using cheese as the starting material is that the fibrous end product could be made essentially lactose-free resulting in an essentially lactose-free meat substitute product which would be suitable for consumption by people having a lactose allergy or being lactose intolerant. Finally, by preparing the homogenous mixture in a single step, the process has a short production time and is relatively simple to engineer on an industrial scale.

DETAILED DESCRIPTION

Accordingly, the present invention relates to a process for the preparation of a fibrous product comprising protein and having a moisture content of at least 65% by weight based on total weight of fibrous product, which process comprises the steps of (a) preparing a homogenous mixture of protein material comprising milk protein material, a moisture binder material, a calcium-complex forming agent, a hydrocolloid which precipitates with metal cations and water;
(b) adding a solution of a metal cation with a valency of at least 2 to the homogenous mixture obtained in step (a) in order to form the fibrous product;
(c) isolating the fibrous product; and
(d) cooling the fibrous product,
wherein in step (a):
the milk protein material comprises cheese;
the homogeneous mixture is prepared by mixing of all ingredients at a temperature in the range of 70 to 90° C.;
the pH of the homogenous mixture obtained in step (a) is in the range of 6.4 to 7.5; and
water is added in such amount that the water content of the homogenous mixture is at least 75% by weight based on total weight of the homogenous mixture and protein content is in the range of 5 to 20% by weight based on total weight of the homogenous mixture.

In step (a) the base mixture is formed which forms the basis for the fibrous product formed in the subsequent steps of the process. It was found that materials used, in particular the milk protein material, and conditions applied in this step (a) are critical for ensuring an end product having the desired properties. Any reference to "milk protein material" in this context refers to products or materials that contain proteins derived from milk, suitably cow's milk or goat milk with cow's milk being preferred.

Firstly, it is essential that the milk protein material comprises cheese, which in the context of the present invention refers to a foil-ripened or traditionally ripened cheese produced from cow's milk or goat milk by ways known in the art. Particularly suitable cheeses based on cow's milk are those of the semi-hard type, such as Gouda, Maasdam, Leerdammer or Edam cheese. Suitable cheeses may have a fat content from 0 to 60% by weight, based on total weight of dry matter in the cheese. For the purpose of the present invention, however, it is preferred to use a cheese having a fat content of at most 15% by weight of fat, preferably at most 10% by weight, based on total weight of the cheese. Such preferred cheeses include, for example, 10+ cheese (fat content usually between 10 and 20% by weight based on total weight of dry matter in the cheese corresponding with a fat content of approximately 4.5 to 9 wt % based on total weight of cheese assuming that the 10+ cheese has a moisture content of 55 wt %) or even 0+ cheese (fat content essentially 0% by weight based on total weight of dry matter in the cheese). In addition to cheese, the starting protein material used may also comprise additional milk protein material other than cheese and/or non-milk protein material, notably plant-based protein material, such as e.g. soy protein or protein originating from chickpeas or lentils. Suitable further milk protein materials include whey protein, whey protein concentrate, whey protein isolate, milk protein concentrate, powdered (skimmed) milk, micellar casein isolate, any caseinate, such as sodium or ammonium caseinate, and any combination of two or more of these milk protein materials. For the purpose of the present invention it is, however, preferred that the protein material consists essentially of cheese, that is, cheese is the sole starting protein material used in step (a).

When using cheese as the sole milk protein starting material, any separate whey removal (e.g. in a separate draining step) is not needed, as most, if not all, of the whey protein has already been removed in the cheese making process. The absence of a separate whey removal step is also an advantage over a process in which a cheese curd is used as the milk protein material. Furthermore, cheese can be stored for some time before it is processed into the fibrous material, whereas a curd needs to be processed shortly after its preparation and cannot be stored. Using cheese as the milk protein starting material, accordingly, has the additional advantage of more flexibility in the base material handling for the process.

The cheese used as the protein material would typically first be comminuted, i.e. cut or chopped into small pieces, before being mixed with the other ingredients in step (a), as this will make melting of the cheese and the formation of the homogenous mixture easier. For example, if a foil-ripened cheese block, traditionally ripened wheel-shaped cheese (or part thereof) or cheese in other forms (such balls) is used, cutting or chopping the cheese into small pieces having a size not exceeding 1 cm or, more suitably, not exceeding 5 mm, will make melting and mixing into the homogenous mixture more easy. Alternatively, grated cheese could be used. Further, in order to facilitate the formation of the homogenous mixture in step (a) some water may be added to the cut or chopped cheese pieces (or grated cheese, if used) before mixing in the other ingredients in step (a). In general, it will also depend on machine specifications of the mixing device used in step (a) how the ingredients could best be processed. This is, however, all part of routine handling of ingredients and equipment.

A second important condition is the temperature applied in step (a) when preparing the homogenous mixture. It was found that this temperature is an important parameter for ensuring the different ingredients are properly mixed. The cheese used should melt at the selected temperature, but at the same time the properties of the ingredients used should not suffer from the temperature applied. Accordingly, it was found that mixing of all ingredients should take place at a temperature in the range of 70 to 90° C., preferably between 70 and 80° C., most preferably between 71 and 75° C., to ensure that a homogenous melt can be formed, whilst at the same time not adversely affecting the properties of the cheese, the moisture binder material and the calcium-complex forming agent. Once formed, the homogenous mixture is suitably cooled slightly to a temperature below 70° C., preferably between 60 and 70° C., more preferably between 64 and 69° C. At such slightly lower temperature the homogenous mixture is still fluid and hence easily processable, whilst the further steps, including cooling later in the process, can be effectively carried out.

The mixing can take place by mixing means and in ways known in the art. It was found that turbulent mixing of the ingredients at the temperature indicated is particularly preferred. Ways of turbulent mixing are well known in the art. Typically such turbulent mixing would involve applying sufficiently high shear. The shear is needed to have a turbulent mixing of the ingredients and facilitates melting of the cheese. An example of a suitable machine to prepare the homogenous melt that could be used on a smaller scale (pilot scale) is the universal machine UM44 ex Stephan Machinery GmbH (750-3000 RPM). At larger scale (factory scale) a Combitherm 800 ex Stephan Machinery GmbH or the BATCH FORMULA® High Shear Vacuum Mixer ex GEA could, for example, be used. In general, any mixing device equipped with a rotating mixer (in particular to enhance turbulent mixing), one or more rotating knifes (to cut the cheese and also enhance mixing) and heating means, such as direct steam injection or a heating mantle, (to facilitate preparation of the melt) would be particularly suitable. An optional feature of applying a vacuum during (part of) the mixing process would also be suitable, as this prevents or suppresses foam formation during mixing.

A third parameter is the target pH of the homogenous mixture to be obtained in step (a). It was found that the homogenous mixture should have a pH in the range of 6.4 to 7.5, preferably 6.5 to 7.2, more preferably 6.7 to 7.1, most preferably 6.8 to 7.0. When using pH conditions during step (a) that result in a homogenous mixture having a pH within the indicated range ensures optimum fiber formation in the subsequent steps. The pH is suitably controlled by adding a base solution that is allowed for use in preparing food products. Examples include aqueous solutions of sodium hydroxide, potassium hydroxide, calcium hydroxide or magnesium hydroxide. Particularly suitable base solutions in this connection would be an aqueous sodium hydroxide (NaOH) or potassium hydroxide (KOH) solution with a sodium hydroxide solution being preferred, as it provides a less bitter taste to the end product than a potassium hydroxide solution. Concentration of the base solution may vary within wide ranges, but should suitably be such that pH of the homogenous mixture can be effectively controlled and steered to the desired value. For example, an aqueous NaOH or KOH solution having a concentration of 0.1 to 10 mole/L could be used, where 2 to 8 mole/L NaOH or KOH solutions could also be conveniently used.

Finally, water should be added in such amount that the water content of the homogenous mixture is at least 75% by weight based on total weight of the homogenous mixture and protein content is in the range of 5 to 20% by weight based on total weight of the homogenous mixture. It was found that adding such high amounts of water combined with a relatively high protein content eventually results in a fibrous end product having a juicy mouthfeel and relatively long fibers. The protein content is important for the final structure of the fibrous end product as well as for its organoleptic properties, such as texture and taste sensation. Apart from the water added, water may be present in one or more of the various ingredients used as well. Firstly, the cheese used typically contains water in an amount that may range from 35% by weight (high fat cheese) to 60% by weight (low or zero fat cheese) based on total weight of cheese. Further, any aqueous base solution used to adjust the pH contains water too. The water contained in those ingredients should be taken into account when aiming for a water content of at least 75% by weight in the homogenous mixture formed. In a preferred embodiment water is added in step (a) in such amount that the water content of the homogenous mixture is between 78 and 90% by weight, more preferably between 79 and 88% by weight, whilst protein content of the homogenous mixture preferably is in the range of 6 to 15% by weight.

The other ingredients used in step (a) in addition to the protein material and water are a moisture binder material, a calcium-complex forming agent and a hydrocolloid which precipitates with metal cations. Further, a base solution may be added to adjust the pH to a value within the range required as described hereinbefore. A small amount of a food grade defoaming agent may also be added in order to prevent foam formation during mixing in step (a). Such food grade defoaming agents are commercially available.

Moisture binder materials that can be used include binder materials that can bind water, e.g. by forming a gel upon binding with water at ambient or elevated temperatures, such as, for example, methylcellulose, chicken egg protein, whey protein or a mixture of two or more of these, or by swelling through absorption of water, such as, for example, oat fiber. The use of oat fiber as a binder material is preferred. Oat fiber not only is an excellent moisture binder, but it also has a neutral taste and is obtainable at low cost, thus contributing to both product quality and low production costs. The binder material is typically added in an amount in the range of 0.5 to 5.0% by weight based on total weight of homogenous mixture, suitably 0.5 to 2.5% by weight, more suitably 0.8 to 1.5% by weight.

The calcium complex-forming agent enables the formation of a homogenous mixture of all components added by forming complexes with the free calcium ions that are inevitably present in the milk protein material. It is important that all free calcium ions are somehow bound before adding the solution of a metal cation with a valency of at least 2 in step (b) in order to enable the formation of fibers in a controlled way. Suitable calcium complex-forming agents and the amounts in which they can be used are described in WO 03/061400 A1, mentioned hereinbefore. Particularly suitable calcium complex-forming agent are phosphate materials, such as alkali metal or ammonium salts of phosphoric acid or polyphosphoric acid, e.g. disodium hydrogenphosphate, trisodium phosphate, sodium hexametaphosphate or sodium polyphosphate. Such phosphate materials, and in particular sodium hexametaphosphate, are for example included in melting salts used in the cheese industry to replace calcium ions bound to the casein with sodium ions to loosen the casein proteins and make them water-soluble. The amount of phosphate material to be used typically is in the range of 0.1 to 2.0, suitably 0.5 to 1.5% by weight based on total weight of the homogenous mixture.

The hydrocolloid which precipitates with metal cations can be added in liquid form (as an aqueous solution) or in solid form (suitably as a powder). It is, however, preferred to add the hydrocolloid as a powder. In this preferred embodiment the hydrocolloid powder is mixed with the other ingredients in step (a) to form the homogeneous mixture. An advantage of using a hydrocolloid powder is that it is easy to dose and does not require the use of an expensive storage tank for a liquid ingredient in an industrial scale process, which in return is beneficial for the economics of such industrial scale process. Furthermore, it was found that when using an alginate powder foaming is less likely to occur and a defoaming agent can accordingly be dispensed with. And finally, a hydrocolloid powder can be blended with the other ingredients in a single mixing step (a) as opposed to an aqueous solution of a hydrocolloid which would require an additional mixing step to ensure accurate mixing of all ingredients into a homogenous mixture.

The hydrocolloid to be used is a hydrocolloid which precipitates with metal cations and typically is a polysaccharide that precipitates by forming metal bridges between the polysaccharide molecules upon addition of the metal cations. In this way a structure is formed that encloses the milk protein parts. Suitable hydrocolloids include pectin with a low methoxyl group content, gellan gum and alginates, the latter being preferred, in particular sodium alginate. The hydrocolloid should be added in such amount that the aforesaid structure formed can enclose all milk protein parts present in the homogenous mixture. Generally, the amount of hydrocolloid used will be in the range of 0.5 to 5% by weight, based on total weight of the homogenous mixture obtained in step (a), typically 1.0 to 2.5% by weight. It was, however, found particularly suitable that in step (a) the hydrocolloid powder is added in such amount that the protein:hydrocolloid weight ratio in the homogenous mixture is in the range of 2.0 to 8.0, preferably 3.5 to 6.5, more preferably 4.0 to 6.0.

In step (b) of the present process a solution of a metal cation with a valency of at least 2 is added to the homogenous mixture obtained in step (a) in order to form the fibrous product. By adding this solution milk protein/hydrocolloid fibers are formed. Essentially two reactions occur which result in the typical fiber structure. Firstly, the metal cation forms bridges between the hydrocolloid molecules, thereby forming a hydrocolloid network. Secondly, the metal cations, and in particular calcium ions, react with the caseins in the homogenous mixture (the caseins being the dominant protein in the homogenous mixture), thereby causing coagulation of the caseins and the formation of a gel-like structure or curd which will also enclose any whey proteins still present in the homogenous mixture. This reaction is also known from cheese manufacturing. Accordingly, the reactions/interactions between the metal cations and the hydrocolloid (alginate) on the one hand and the reactions between the metal cations and the protein molecules (in particular caseins) on the other hand cause the typical structure of the fibers formed. Any fat will be included in the fibers by being captured in the alginate/protein network formed. The fiber structure can be further enhanced by mechanical force exerted on to the homogenous mixture while the alginate network is formed. Suitably such mechanical force is exerted in a single linear direction, so that the network structure formed is stretched into linearly extending fibers. Any mixing device capable of exerting such linear mechanical force, e.g. devices with screws, paddles or suitably shaped mixing blades could be used. Such devices are commercially available. Specific examples of suitable mixing devices include paddle mixers and Z-blade mixers.

The metal cation solution suitably is an aqueous solution containing dissolved calcium or magnesium salts or mixtures of such salts. Particularly suitable salts are calcium chloride, calcium acetate or calcium gluconate with calcium chloride ($CaCl_2$) being preferred. Hence, the preferred solution of a metal cation with a valency of at least 2 is an aqueous solution of a calcium salt, preferably an aqueous solution of calcium chloride, so that the preferred metal cation with a valency of at least two is a calcium cation.

The metal cation is typically added in such amount that sufficient bridges between the hydrocolloid molecules can be formed to create a sufficiently strong network, whilst at the same adequately coagulating the protein and binding the protein molecules into such network. Generally, when using sodium alginate as the hydrocolloid, between 4 and 10 moles of metal cation per kg of sodium alginate is added, suitably between 5 and 9 moles of metal cation per kg of sodium alginate. Very good results have been obtained when using between 5 and 7 moles of metal cation per kg of sodium alginate. So when using an aqueous calcium chloride solution in step (b), calcium chloride is generally added in such amount that the calcium:sodium alginate weight ratio is generally between 0.16 and 0.40, suitably between 0.20 and 0.36 and more suitably between 0.20 and 0.28. Since calcium interacts with both the hydrocolloid and the protein molecules, to form the fibrous network, the amount of protein in the homogenous mixture should also be taken into account when adding calcium chloride. Accordingly, in addition to the calcium:sodium alginate weight ratio, the weight ratio between calcium on the one hand and the combined weights of sodium alginate and protein also plays a role. This calcium:(alginate+protein) weight ratio is usually in the range of 0.035 to 0.065, suitably 0.040 to 0.050.

The metal cation solution is typically added to the homogenous mixture resulting from step (a) at a temperature of at least 40° C., for example at the same temperature at which the homogenous mixture is obtained at the end of step (a), but suitably at a slightly lower temperature, such as at a temperature between 40 and 70° C., preferably between 45 and 65° C. Mixing takes place for sufficient time to allow formation of the fibrous product, which will usually not exceed 1 hour and typically is in the range of 2 to 30 minutes, suitably 5 to 20 minutes.

After formation of the fibrous product in step (b), this product is isolated in step (c). This can be done by ways known in the art.

In a suitable embodiment the fibrous product obtained in step (b) is first drained to remove any excess water and components dissolved therein (e.g. sodium, amino acids, water soluble peptides) and is subsequently thoroughly washed one or more times with water to remove any traces of metal cations. Such washing with water would suitably take place by rinsing with water, e.g. after the fibrous product resulting from step (b) has been placed on a sieve that retains the fibers formed, thus isolating the fibrous product. Alternatively, if the mixing device used in step (b) is provided with a water outlet, suitably having a sieve included therein, then the washing can take place inside this device by adding water and removing the water via the water outlet, thus retaining the fibers inside the mixing device.

During the isolation step, the fibers may then be pressed to remove any liquid still contained in the fibers. Optionally, the fibrous product thus obtained may be packed before subjecting it to cooling in step (d). During isolation step (c) the temperature of the fibrous product may decrease relative to the temperature of the fibrous product resulting from step (b), particularly when washing with cold water, i.e. water having a temperature of 20° C. or less. Accordingly, the temperature of the fibrous product may drop during isolation step (c) to as low as 30° C., although typically the temperature of the fibrous product after isolation step (c) will be at least 35° C. and may be as high as the temperature of the product resulting from step (b), although a temperature of at most 50° C. would be preferred. Hence, the temperature of the isolated fibrous product after step (c) before cooling step (d) may suitably be in the range of 35° C. to 50° C.

In step (d), finally, the isolated fibrous product resulting from step (c) is cooled, typically to a temperature below 10° C. Such cooling can be effected in different ways. For example, a conventional cooling step would typically involve placing the fibrous product to be cooled in a cooling cell that is kept at the desired end temperature and/or by blowing cold air over the warm fibrous product (air blast cooling). Such conventional cooling treatments would typically take at least several hours. Alternatively, vacuum cooling may be applied, such as described in co-pending European patent application No. 20159861.2. In general, vacuum cooling involves cooling a product under pressures lower than atmospheric pressure. Vacuum cooling works on the principle of latent heat of evaporation to remove the sensible heat of cooled products. The quantity of the heat removed from the product is directly related to the amount of water evaporated from the products. The water in the product starts to boil at relatively low temperature and starts to evaporate from the product, thereby taking the heat from the product which is thus cooled. For vacuum cooling to work, the product to be cooled needs to be sufficiently porous and should contain at least some free water around it, which is the case with the fibrous product prepared according to the method of the invention.

The fibrous product prepared in the process of the present invention has a relatively high moisture content of at least 65% by weight, based on total weight of fibrous product, preferably 65 to 85% by weight, more preferably 70 to 83% by weight. The pH of the fibrous product generally ranges from 5.8 to 7.0, but suitably is between 6.0 and 6.5. Fat content and protein content will depend on the cheese used as the starting material and possibly additional milk protein materials as described hereinbefore, and can be selected depending on taste preferences.

Once cooled, the fibrous product can be further processed into the final meat substitute product by ways known in the art. Such further processing may involve adding binder materials, herbs, spices and other ingredients depending on the type and taste of meat substitute product desired. For example, WO 2006/009426 A1 discloses the addition of a specific binder material to the fibrous product when further processing the fibrous product into the final meat substitute product. According to WO 2006/009426 A1 this binder material gels upon heating and is selected from methylcellulose, hydroxypropylmethylcellulose, curdlan gum, konjac gum, chicken egg protein, whey protein and mixtures of two or more of these binders. Further processing may also involve heating in a microwave, baking in a pan, welling or deep-frying before consumption in order to render the product in another desirable attractive state. After such treatment the product may be consumed directly or be frozen and packaged to be consumed later. The present invention, accordingly, also relates to use of the fibrous product obtained by the process described hereinbefore for the preparation of a meat substitute product and to a meat substitute product comprising the fibrous product obtainable by the process as described hereinbefore. When using cheese as the sole milk protein material, the lactose content of the fibrous product and any meat substitute product derived therefrom will be very low, typically less than 0.5% by weight based on total weight of product, preferably less than 0.1% by weight and more preferably less than 0.01% by weight.

The invention is illustrated by the following examples without limiting the scope of the invention to these specific embodiments.

EXAMPLES

Methods Used
pH is determined in accordance with standard method NEN 3775.
Dry matter content is determined in accordance with standard method ISO 5534 for cheese and processed cheese products. Moisture content is calculated from the dry matter content as the balance up to 100 wt %.
Fat content is determined in accordance with standard method ISO 1735 for cheese and processed cheese products.
Protein content is determined in accordance with standard method ISO 8968-1 (as % N*6.38).
Calcium content is determined in accordance with standard method ISO 11885 (ICP-OES method).

Example 1

An amount of 156.0 kg of 10+ cheese (base properties in Table 1 below) in the form of cheese balls (1.9 kg per ball) together with 142.0 kg of cold water were loaded into a Combitherm 800 mixing device ex Stephan Machinery GmbH. In the Combitherm 800 the cheese balls were cut and mixed with the water (agitator speed (i.e. knife settings): 20 seconds at 1500 rotations per minute (RPM), 40 seconds at 2250 RPM, and 20 seconds at 3000 RPM, Vacuum 450 mbar, Temperature 18.4° C.). After the cheese was cut in small pieces (<5 mm) the other ingredients were added: 360.0 kg of water, 5.48 kg of sodium polyphosphate, 6.25 kg of oat fiber, 6.92 kg of 25 wt % NaOH solution and 10.5 kg of sodium alginate powder. The ingredients were turbulently mixed for 105 seconds at 100% of the mixing capacity: agitator speed at 3000 RPM. The mixture was subsequently heated to 73° C. via direct steam injection (injecting 63.0 kg of water as steam), under vacuum of 600 mbar, and mixed for another 7 minutes at 100% of the mixing capacity, thereby obtaining a smooth homogenous mixture without any particles as a melt having a temperature of 75.6° C. This homogenous mixture was then cooled inside the Combitherm 800 to about 62.5° C. in 16 minutes. The pH of the homogenous mixture was 7.15.

708 kg of the homogenous mixture was subsequently pumped into a paddle mixer and 200 kg of 3.3 wt % $CaCl_2$ solution (wt % based on total weight of $CaCl_2$ solution) were gradually added to the homogenous mixture while mixing. The mixture had a temperature of 45.5° C. and the fibers were formed during the mixing. After approximately 11.5 minutes the reaction was complete and the fibers had been formed. A part of the excess water was removed by draining. The remaining fiber and excess water were washed/diluted with water. The fibers were separated from the mixture over a sieve and cooled down in a vacuum cooler to 2-7° C.

The fibers obtained had a neutral taste and high moisture content (76.2 wt %). Results are indicated in Table 2.

TABLE 1

| Cheese base properties [1] | |
|---|---|
| Fat (wt %) | 7 |
| of which saturated (wt %) | 5 |
| Carbohydrates (wt %) | 0 |
| Protein (wt %) | 32 |
| Moisture (wt %) | 56 |
| pH | 5.35 |

[1] weight percentages (wt %) based on total weight of cheese

TABLE 2

| Results [1] | | |
|---|---|---|
| | Homogenous mixture | Fibrous product |
| pH | 7.15 | 6.21 |
| Dry matter (wt %) | 12.5 | 23.8 |
| Moisture (wt %) | 87.5 | 76.2 |
| Fat (wt %) | 1.5 | 3.0 |
| Protein (calculated, wt %) | 6.6 | |
| Protein (measured, wt %) | 7.0 | 14.4 |
| Alginate (wt %) | 1.4 | |
| Protein/Alginate (w/w) | 4.7 | |
| Ca/Alginate (w/w) | 0.240 | |
| Ca/(Alginate + Protein, calc) (w/w) | 0.040 | |

[1] weight percentages (wt %) based on total weight of homogenous mixture or fibrous product, as appropriate Example 2

An amount of 312 grams of the same 10+ cheese as used in Example 1 together with 1.130 kg of hot water (90° C.), 11 grams of sodium polyphosphate, 12 grams of oat fiber, 14 grams of a 25% (w/w) NaOH solution and 21 grams of sodium alginate powder were mixed in a kitchen blender (Cooking Chef ex Kenwood) and mixed until a homogenous mixture was obtained. At regular intervals during the mixing the bowl containing the mixture was placed in a water bath of 70° C. in order to maintain the temperature around 70° C. during mixing. The homogenous mixture obtained had a pH of 7.1.

273 grams of this mixture of was then transferred to a Z-blade mixer ex Winkworth (type: MZ05-18). The temperature of the wall of the Z-blade mixer was set at 60° C. and mixing continued.

Subsequently, 77 grams of a 3.3 wt % CaCl$_2$ solution (wt % based on total weight of CaCl$_2$ solution) were gradually added to the 273 grams of homogenous mixture in the Z-blade mixer while mixing. The mixture had a temperature of 57° C. and the fibers were formed during the mixing. After approximately 5 minutes the reaction was complete and the fibers had been formed. The complete mixture was poured into a sieve and excess water was removed by draining. The remaining fiber and any remaining excess water were washed/diluted with water. The fibers were separated from the mixture over a sieve, drained by pressing and cooled in a refrigerator to approximately 5° C.

The fibrous product formed consisted of solid, dry fibers, that were soft and had a good texture. They had a neutral taste, an off-white colour and were not sticky.

Properties of the homogenous mixture and the fibrous product formed are indicated in Table 3.

Example 3

Example A of WO 2005/004624 A1 was repeated. The absolute amounts were adjusted, but the relative amounts were identical. When preparing the fibers the same calcium to (alginate+protein) weight ratio was used as in Example 2.

Accordingly, 964 grams of water was added to 482 grams of the same 10+ cheese as used in Example 1 together with 14 grams of sodium polyphosphate. The components were mixed in the same way as described in Example 2, resulting in a cheese emulsion. The pH of this emulsion was set at 7 by adding 45 ml of a 10% (w/w) NaOH solution. Subsequently, 40 grams of sodium alginate powder were added whilst mixing continued and a homogenous, smooth mixture was obtained. This mixture had a pH of 7.0

240 grams of this mixture was transferred to the Z-blade mixer of Example 2. The temperature of the wall of the Z-blade mixer was set at 60° C. and 110 grams of a 3.3 wt % CaCl$_2$ solution (wt % based on total weight of CaCl$_2$ solution) were gradually added to the homogenous mixture while mixing. After approximately 5 minutes the reaction was complete and the fibers had been formed.

The complete mixture was poured into a sieve and excess water was removed by draining. The remaining fiber and any remaining excess water were washed/diluted with water. The fibers were separated from the mixture over a sieve, drained by pressing and cooled in a refrigerator to approximately 5° C.

The fibrous product formed consisted of solid, dry fibers, that were soft and had a good texture, but were somewhat smaller than the fibers formed in Example 2. They had an off-white colour and were not sticky Properties of the homogenous mixture and the fibrous product formed are indicated in Table 3.

TABLE 3

Results Examples 2 and 3 [1]

|  | Homogenous mixture | | Fibrous product | |
| --- | --- | --- | --- | --- |
|  | Example 2 | Example 3 | Example 2 | Example 3 |
| pH | 7.1 | 7.0 | 6.31 | 6.21 |
| Dry matter (wt %) | 13.0 | 18.7 | 17.9 | 21.8 |
| Moisture (wt %) | 87.0 | 81.3 | 82.1 | 78.2 |
| Fat (wt %) | 1.4 | 2.3 | 2.3 | 3.0 |
| Protein (calculated wt %) | 6.7 | 10.3 |  |  |
| Protein (measured, wt %) | 7.2 | 11.4 | 11.0 | 14.0 |
| Calcium (mg/kg) | 2500 | 3900 | 8500 | 11000 |
| Alginate (wt %) | 1.4 | 2.7 |  |  |
| Protein/Alginate (w/w) | 4.7 | 3.8 |  |  |
| Ca/Alginate (w/w) | 0.240 | 0.203 |  |  |
| Ca/(Alginate + Protein, calc) (w/w) | 0.042 | 0.042 |  |  |

[1] weight percentages (wt %) based on total weight of homogenous mixture or fibrous product, as appropriate As can be seen from Table 3 the fibrous product prepared according to the method of the present invention has a higher moisture content and hence will have a more juicy mouth-feel, whilst at the same time consisting of slightly longer fibers and exhibiting a texture similar to the fiber produced according to the prior art method of Example 3.

The invention claimed is:

1. A process for the preparation of a fibrous product suitable as a basis for meat substitute products comprising protein and having a moisture content of at least 65% by weight based on total weight of fibrous product, which process comprises the steps of:
    (a) preparing a homogenous mixture of ingredients including protein material comprising milk protein material, a moisture binder material, a calcium-complex forming agent, a hydrocolloid which precipitates with metal cations and water;
    (b) adding a solution of a metal cation with a valency of at least 2 to the homogenous mixture obtained in the step (a) in order to form the fibrous product;
    (c) isolating the fibrous product; and
    (d) cooling the fibrous product,
    wherein in the step (a):
        the milk protein material comprises cheese;
        the homogenous mixture is prepared by combining all of the ingredients prior to substantial mixing and mixing of all of the ingredients at a temperature in a range of 70 to 90° C. to form the homogenous mixture;
        the pH of the homogenous mixture obtained in the step (a) is in a range of 6.4 to 7.5; and
        water is added in such amount that a water content of the homogenous mixture is at least 75% by weight based on total weight of the homogenous mixture and total protein content is in a range of 5 to 20% by weight based on total weight of the homogenous mixture.

2. The process according to claim 1, wherein the cheese comprises at most 15% by weight of fat based on total weight of the cheese.

3. The process according to claim 1, wherein the homogenous mixture is prepared in the step (a) at a temperature between 71 and 75° C.

4. The process according to claim 1, wherein the pH of the homogenous mixture obtained in the step (a) is in the range of 6.5 to 7.2.

5. The process according to claim 1, wherein the water is added in the step (a) in such amount that the water content of the homogenous mixture is between 78 and 90% by weight.

6. The process according to claim 1, wherein the calcium-complex forming agent is a phosphate material.

7. The process according to claim 1, wherein the moisture binder material is oat fiber, cellulose, chicken egg protein or a mixture of two or more of these.

8. The process according to claim 1, wherein the hydrocolloid in the step (a) is added in a powder form.

9. The process according to claim 1, wherein in the step (a) the hydrocolloid is added in such amount that a protein:hydrocolloid weight ratio is in a range of 2.0 to 8.0.

10. The process according to claim 1, wherein the hydrocolloid is an alginate.

11. The process according to claim 1, wherein the solution of a metal cation with a valency of at least 2 is an aqueous solution of a calcium salt.

12. The process according to claim 1, wherein the cheese comprises at most 10% by weight of fat based on total weight of the cheese.

13. The process according to claim 4, wherein the pH of the homogenous mixture obtained in step (a) is in the range of 6.7 to 7.1.

14. The process according to claim 5, wherein the water is added in step (a) in such amount that the water content of the homogenous mixture is between 79 and 88% by weight.

15. The process according to claim 1, wherein the moisture binder material is oat fiber.

16. The process according to claim 9, wherein in the step (a) the hydrocolloid is added in such amount that the protein:hydrocolloid weight ratio is in the range of 3.5 to 6.5.

17. The process according to claim 10, wherein the hydrocolloid is sodium alginate.

18. The process according to claim 11, wherein the solution of a metal cation with a valency of at least 2 is an aqueous solution of calcium chloride.

* * * * *